Jan. 9, 1934.                E. D. TILLYER                1,942,850
                            EYE TESTING DEVICE
                         Filed Oct. 25 1929          3 Sheets-Sheet 2
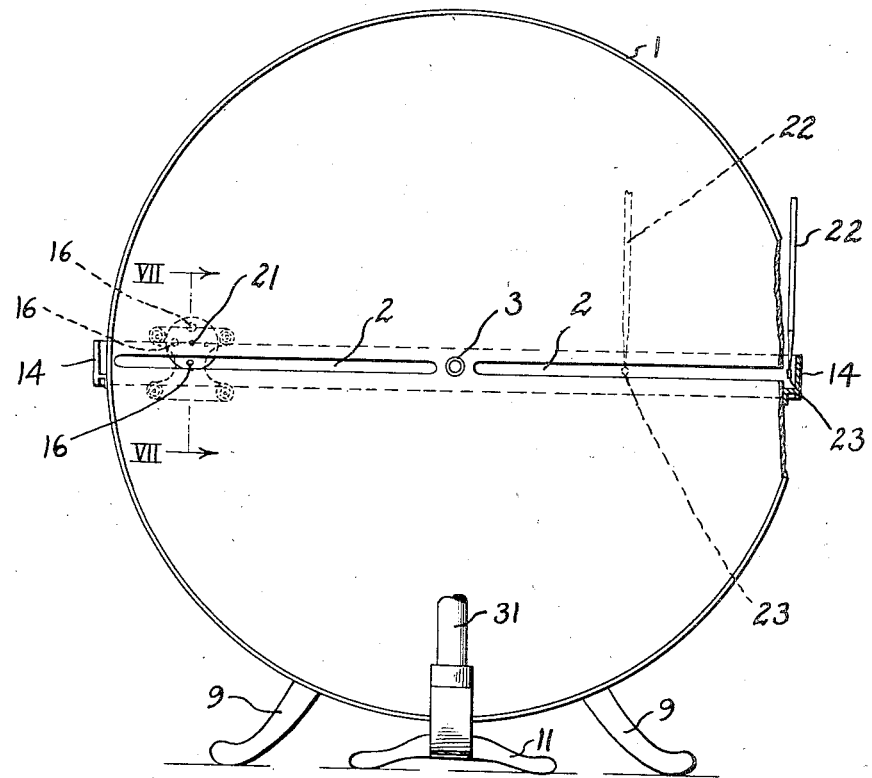
Fig. V.
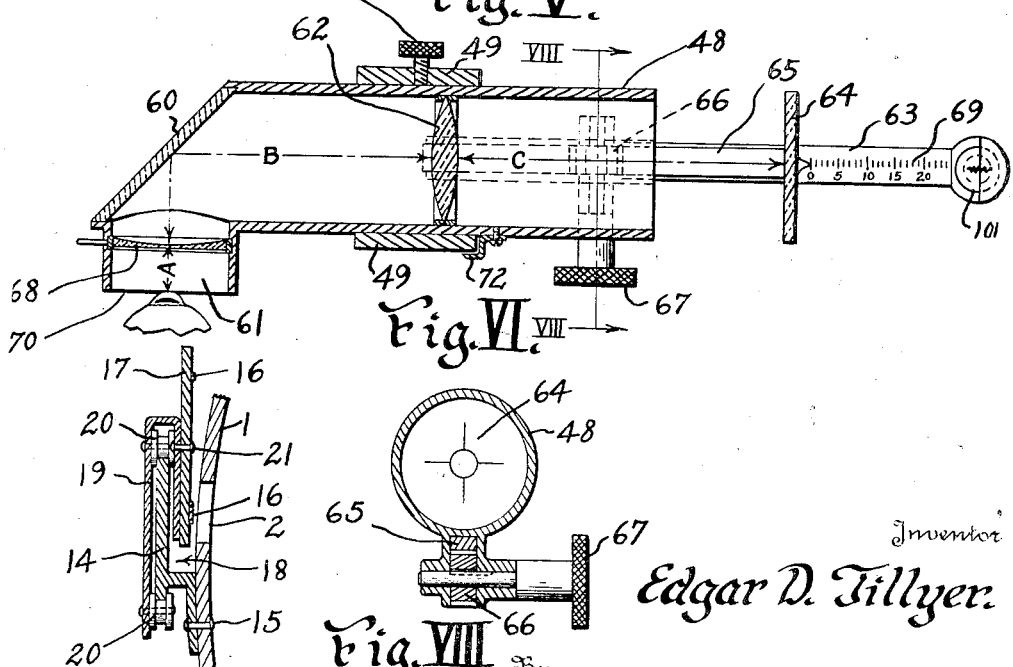
Fig. VI.
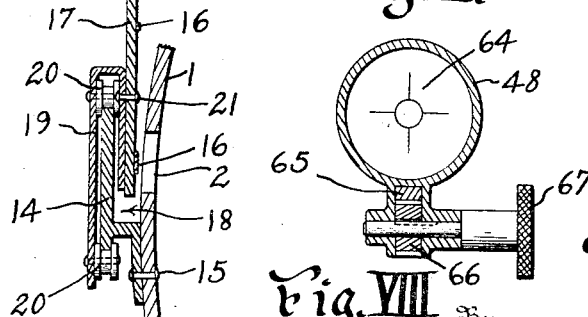
Fig. VII.          Fig. VIII.
Inventor
Edgar D. Tillyer.
By Harry H. Styll.
Attorney Jan. 9, 1934.　　　　　E. D. TILLYER　　　　　1,942,850
EYE TESTING DEVICE
Filed Oct. 25 1929　　　　3 Sheets-Sheet 3
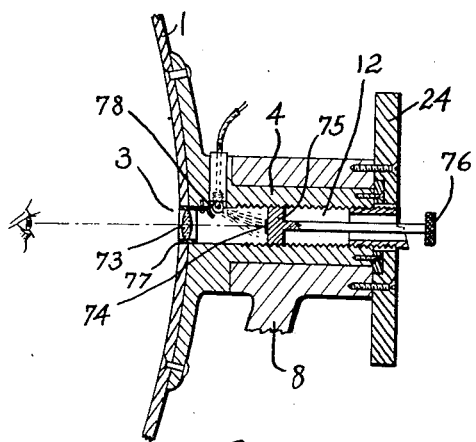
Fig. IX.
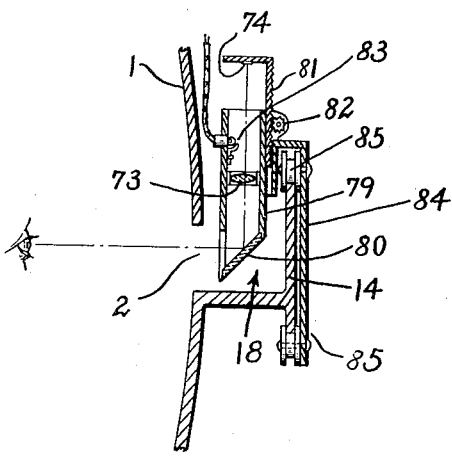
Fig. X.
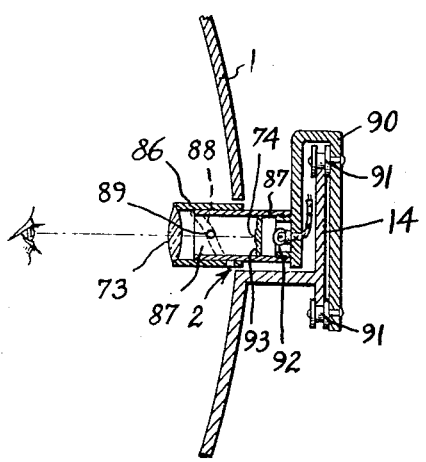
Fig. XI.
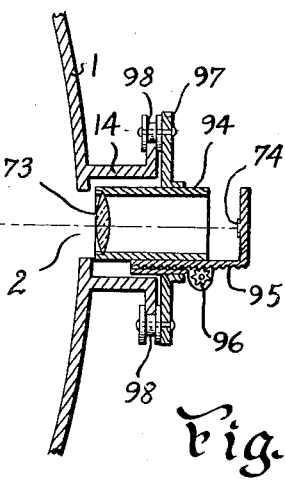
Fig. XII.
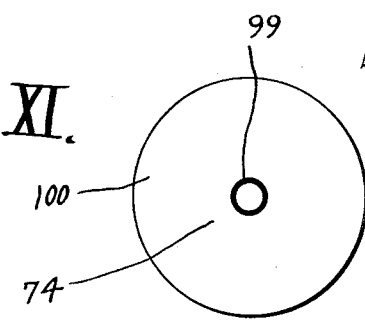
Fig. XIII.
Inventor
Edgar D. Tillyer.
By Harry H. Styll
Attorney Patented Jan. 9, 1934

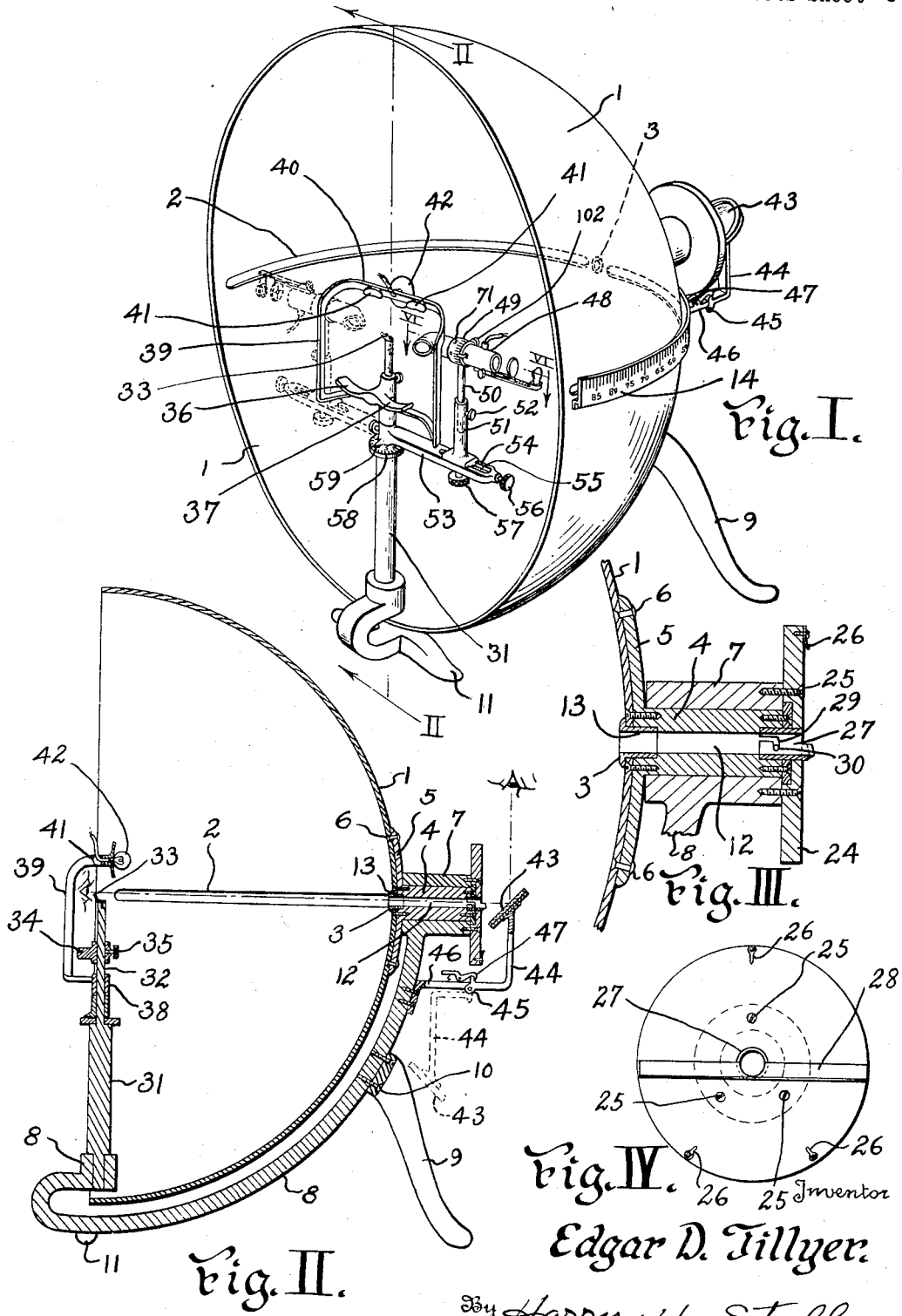

1,942,850

UNITED STATES PATENT OFFICE 1,942,850

EYE-TESTING DEVICE

Edgar D. Tillyer, Southbridge, Mass., assignor to American Optical Company, Southbridge, Mass., a voluntary association of Massachusetts Application October 25, 1929. Serial No. 402,413

14 Claims. (Cl. 88—20)

This invention relates to improvements in eye testing devices and has particular reference to an improved perimeter or device for testing and measuring the field of vision.

One of the principal objects of the invention is to provide improved means for shutting off extraneous distracting objects from the patient's field of vision during the test.

Another important object of the invention is to provide means for correcting the vision of the patient's eye not under test and thus obtaining improved binocular fixation during the test.

Another object of the invention is to provide improved means enabling the examiner to watch the patient's eye during the test to see if it is in perfect alignment with the eye fixation spot and that the eye under test does not move during the test.

Another object is to secure uniform illumination of the complete field.

Another object is to provide improved means for accurate focusing of the fixation object before the eye under test.

Another object is to effectively by optical means increase the diameter of the field of the hemisphere of the device.

Another object is to provide spherical and cylindrical corrections for the patient's eye not under test.

Another object is to provide improved means for measuring the central field of vision, the peripheral field of vision without limitation and for measuring Phorias and for plotting the field of vision of a patient showing the location of blind spots and other visual defects.

Another object is to provide improved means for adjusting the fixation spot of the eye not under test to coincide with the fixation object of the eye under test.

Another object of the invention is to provide uniform scale means for measuring the amount of movement of the fixation spot and thereby determine the amount of spherical error in the patient's eye not under test.

Another object of the invention is to provide improved means for stereoscopic tests such as superimposing one fixation object upon the other.

Another object of the invention is to restrict the patient's vision to the area necessary for making the test and to obviate all objects outside of this field.

Another object is to provide improved means for measuring the general field of vision of a patient and locating accurately in said field the various defects of vision usual in such an examination.

Another object of the invention is to provide simple, efficient and economical means for carrying out all of the tests usual in perimetry.

Other objects and advantages of the invention will become apparent from the following description taken in connection with the accompanying drawings, and it will be apparent that many changes may be made in the details of construction and arrangement of parts without departing from the spirit of the invention as expressed in the accompanying claims. I, therefore, do not wish to be limited to the exact details of construction and arrangement of parts shown as the preferred forms only have been shown by way of illustration.

Referring to the drawings:

Fig. I is a perspective view of the device embodying the invention;

Fig. II is a section on line II—II of Fig. I;

Fig. III is an enlarged fragmentary sectional view of the fixation spot and chart holder shown in section in Fig. II;

Fig. IV is a face view of the chart holder and marking guide;

Fig. V is a front elevation of the device shown in Fig. I with portions thereof removed and in section;

Fig. VI is an enlarged section on line VI—VI of Fig. I;

Fig. VII is an enlarged section on line VII—VII of Fig. V;

Fig. VIII is a section on line VIII—VIII of Fig. VI;

Fig. IX is a cross section similar to Fig. III showing a modification;

Fig. X is a cross section similar to Fig. VII showing a modification;

Fig. XI is a cross section similar to Fig. VII showing still another modification;

Fig. XII is a cross section similar to Fig. VII showing another modification;

Fig. XIII is a front view of the fixation member of Figs. IX, X, XI and XII.

Referring to the drawings wherein similar reference characters denote corresponding parts throughout, my invention comprises broadly the following elements: a hemispherical field member 1, a double fixation member, means for illuminating the field, means for positioning the eye under test, means for observing the eye while under test, means for giving the effect of a large field when using a small one, and color provisions.

The field member 1 comprises a hemispherical body having a slotted portion 2 extending a short distance from the pole of the hemisphere to a position adjacent its outer or equatorial edge. The hemisphere 1 is pivotally mounted at the fixation point 3 by the mechanism indicated in Figs. II and III. Over the polar portion of the hemisphere 1 is a bearing sleeve 4 having a flange 5 which is riveted to the hemisphere 1 by the rivets 6. The bearing sleeve 4 fits in the bearing portion 7 of the supporting frame member 8 having the feet members 9 secured thereto by the screws 10. The support member 8 also has the foot 11, so that the frame member may be seated and held in an upright position. It will be noted that the bearing portion 4 has a hollow central bore 12 into which the fixation object sleeve 13 is fitted forming a fixation object at the point 3, at the central polar portion of the hemisphere 1. It will be seen that by thus pivotally mounting the hemisphere 1 in the support 8, the hemisphere may be rotated on the bearing 4 to position the slot 2 in any desired meridian.

It will be noted also that the slotted portion 2 is formed in two separated portions, one on each side of the fixation object 3. Spaced from and surrounding the hemisphere over the slide portion is the bracket member 14 which is calibrated on its outer surface to indicate the degrees progressing from the fixation object outwardly. This bracket member 14 is shown in section in Fig. VII and is secured to the hemisphere 1 by the rivets 15. A movable fixation object 16 is carried by a plate 17 which projects into the opening 18 between the hemisphere 1 and the bracket plate 14. Secured to this plate is a second bracket plate 19 carrying rollers 20 which roll on and engage the upper and lower edges of the bracket plate 14. The plate 17 is pivoted at the point 21 Fig. V, so that different test objects 16 may be moved into position in line with the slot 2 of the hemisphere 1. It will be understood that the fixation object 16 may be moved along the slot 2 in any desired position from the center outwardly, and also that the hemisphere 1 may be rotated on its pivot bearing 4 so that any position of the field may thus be obtained for the fixation object 16.

Referring to Fig. V, there is indicated a hand fixation object 22 having a fixation point 23. This hand fixation member may be inserted in the space 18 between the hemisphere 1 and the bracket 14 and moved along the slot 2 so that the field may be taken with the point 23 of the hand fixation object 22 in preference to using the roller fixation 16.

It will be understood that the advantage of the hemispherical field 1 is that it excludes from the eyes of the patient being tested anything beyond the field. If only a radial band were used the patient could see objects beyond the field and the operator's hand and other movements distracting his attention and causing his eye to rove.

The chart on which the field is to be plotted is carried by the chart plate 24 which is secured by the screws 25, to the support frame 8, the chart being held on the plate 24 by the clip members 26. It will be seen then that the chart support is stationary with relation to the frame 8. In the central opening of the chart plate 24 extending into the bore 12 of the bearing 4 is a tubular member 27 which carries a marking guide 28 (see Fig. IV). This tubular member 27 has an offset slotted portion 29 fitting over a pin 30 thus forming a bayonet joint, the pin 30 being secured in the bearing 4 so that the tube 27 may be inserted in the bore 12 and locked in place, or may be removed therefrom. It will, therefore, be seen that to remove the chart it will be necessary to remove the tubular member 27. The reason that the chart member 24 is stationary and the rule member 28 is rotatable with the hemisphere 1 is that the chart should be plotted in the direction of the operator looking into the patient's eye.

The device for locating the position of the eye when it is being tested comprises a post 31 secured in the forward portion of the support 8. The post 31 has the reduced portion 32 which carries a sight member 33 adjacent its top, which sight member is to locate the position of the eye being tested. The point 33 remains fixed and is at the center of curvature of the hemispherical member 1 which positions the eye on that center in axial alignment with the fixation point 3. Slidably mounted on the reduced portion 32 of the member 31 is the chin rest 34 locked in position by the set screw 35. The chin rest 34 has a depressed portion 36 on one side and a similar depressed portion 37 on the other side in which the chin may be rested. It will be noted that the chin rest 34 is so positioned that when the left eye is being tested the chin rests in the depression 37 and when the right eye is being tested the chin rests in the depressed portion 36. In this way the eye under test is located at the point 33 which is the center of the hemisphere 1.

Secured on the reduced portion 32 of the member 31 is a support 38 carrying the frame work 39 having the cross piece or connecting bar 40 which connecting bar carries the brow rest 41. This rest is stationary on the member 31. Secured to the cross piece 40 is the electric light 42 which uniformly illuminates the interior surface of the hemisphere 1 being located as near to the point 33 as practical to give clearness during the testing operation. This gives uniform illumination of the field of the instrument.

Carried by the frame 8 is a mirror 43 axially aligned with the bore 12 of the bearing 4 and at an inclination thereto of substantially forty-five degrees. This mirror 43 is carried by a support rod 44 pivoted at 45 to the support 46 which is secured to the frame 8. The arm 44 carrying the mirror 43 may be swung around the pivot 45 to the position indicated in dotted lines by releasing the latch member 47 carried by the arm 46 and adapted to engage the arm 44. This mirror may be used by the operator to view the eye of the patient during the testing operation, if desired, being used principally to view the eye under test to see that it is in alignment with the fixation point 3.

The double fixation member comprises the tube 48 mounted for axial rotation in the sleeve 49 carried by the rod 50 which is slidably positioned in the support 51 being locked in desired position therein by means of the set screw 52. The tube member 48 may be locked in adjusted position by the thumb screw 102. The support 51 is slidably mounted on an arm 53 which is slotted at 54 to receive the screw member 55 which engages the base of the support 51. By turning the head 56 of the screw member 55 the support 51 may be moved longitudinally on the arm 53 to desired position and locked by the set screw 57. The arm 53 is rotatably supported on the support 31.

Adjacent the pivotal point of the arm 53 on the support 31 is a scale plate 58 with which a finger 59 on the arm 53 registers to show the amount of angular movement of the arm 53 about the support 31. It is clear that the tube 48 may be swung from one side of the support 31 to the other side depending on which eye is being tested.

In Fig. VI I have shown a longitudinal cross section through the tube 48. The inner end of the tube 48 is fitted with the inclined mirror 60 which is aligned with the eye opening 61. Within the tube 48 is mounted a fixation lens 62. Secured to the under side of the tube 48 is a scale arm 63 on which is slidably mounted a target support 64.

Referring to Fig. VIII showing a cross section with the target plate in position, it will be noted that the rack 65 meshes with a gear pinion 66 which is turned by the hand wheel 67. Therefore, by turning the hand wheel 67 the target plate may be moved back and forth in a line with the axis of the tube 48 to change its position with respect to the lens 62. In the eye opening 61 of the tube 48 is mounted a cylindrical lens 68. The object of this lens is to correct the astigmatic error of the eye not under test and its position is approximately fourteen millimeters in front of the cornea of the eye not under test, indicated by A. This fourteen millimeter distance is an illustration of the position of the spectacle lens which would be used for correcting that eye; if the spectacle lens is to be some other distance this fourteen millimeters would be changed to that distance.

The distance B between the lenses 62 and 68 is such that the lens 68 is at one of the principal foci of the lens 62. The distance C from the lens 62 to the zero mark on the scale is such that the target 64 is at another principal foci of the lens 62. This makes a uniform scale of diopters indicated by 69 on the scale 63 so that when the chart 64 is moved either towards or away from the lens 62 the spherical correction of the eye is changed. If the chart is moved towards the eye it is equivalent to requiring a negative correction for the eye. If the chart is moved away from the eye it is the equivalent to requiring a positive correction for the eye. This gives the spherical correction for the eye.

The line 70 of the tubular member 48 is positioned with respect to the eye not under test so that it is tangent with the cornea of the eye, thus giving a definite position for the equivalent spectacle lens.

The bearing 49 for the tube 48 has a scale 71 and there is an indicator 72 on the tube 48, which scale indicates the amount of axial rotative movement of the tube 48 in the bearing 49. The tube 48 is used for binocular fixation, that is, the opening 61 is aligned with the eye not under test and the target 64 adjusted to proper distance and the tube 48 moved on its arm connections so that the target 64 may be superimposed upon the fixation object at 3. When the other eye is tested the tube 49 is swung from one side of the post 31 to the other and the tube 48 rotated on its bearing 49 to bring the opening 61 in line with the other eye which is not under test.

The scale 58 and pointer 59 and the scale 71 and pointer 72 indicate the amount of movements which are indicative of the Phorias or imbalances of the eye. By means of the target 64 and the scale 69 the spherical correction of the eye may be read and the cylindrical correction may be taken care of by the lens 68.

The spherical power of the eye not under test is obtained by moving the object member 64 back and forth on the member 63 until the object 64 is clearly focused and the spherical power will be indicated by the pointer on the scale 69. In the case of the cylindrical lens 68 it will be understood that the lens 68 is a lens of power to correct the astigmatism of the eye not under test, this power being known and the lens 68 taken from the trial case. This gives clear vision for the eye not under test. Of course, the power of the cylindrical lens 68 could be obtained by the use of trial lenses inserted in the place of the lens 68 in the same manner that cylindrical power is tested for with power lenses finding the power in the two major meridians, but the prime object of the lens 68 in this device is to give clear vision to the patient in the eye not under test. It will be understood, of course, that the lens 68 being cylindrical, the cylindrical lens is put in the holder at 61 in proper axial relation to the eye.

The instrumentalities by which a small hemisphere may be used in conjunction with optical means giving the effect of infinity, comprise a positive lens 73 in conjunction with a target or fixation member 74 and means by which the distance between the lens 73 and fixation object 74 may be changed. The arrangements of this lens and test object system are shown in Figs. IX, X, XI and XII. In Fig. IX the lens 73 is located at the pole or fixation point 3 of the hemisphere 1 and the fixation member 74 is carried by the piston member 75 having threaded relation with the bore 12 of the bearing 4. The distance between the fixation object 74 and the lens 73 is regulated by turning the handle 76 which causes the member 75 to move towards or away from the lens 73 in accordance with the direction in which it is turned. The lens 73 is held in a ring 77 which may be slipped into or out of the bore 12 of the bearing 4. The fixation object 74 is illuminated by means of the electric bulb 78 which is carried through an opening in the bearing 4 so that it illuminates the bore 12 between the lens 73 and the fixation object 74. The piston member 75 may be removed from the bore 12 by screwing it out.

In the device shown in Fig. X a tubular member 79 carries an inclined mirror 80 which is aligned with the slot 2 in the hemisphere 1. The tube 79 extends longitudinally in the space 18 and carries the lens 73 intermediate its ends. The fixation object 74 is carried by a rack member 81 operated by a pinion 82. An electric bulb 83 within the tube and located between the lens 73 and fixation object 74 provides illumination. The distance between the lens 73 and the fixation object 74 is regulated by the rack 81 and pinion 82. The tube 79 is secured to a carrier 84 having the wheels 85 bearing on the edges of the bracket member 14. It will be seen that the tube 79 may be moved along the slot 2 to any desired position therein.

In Fig. XI the lens 73 is carried in a tubular member 86 which is slidingly fitted over a second tubular member 87 which extends through the slot 2 in the hemisphere 1. Within the second tube 87 is carried the fixation object 74. There is a spiral slot 88 in the tube 86 and a pin 89 on the tube 87. By turning the tube 86 the lens 73 may be moved so that the distance from it to the fixation object 74 may be changed. The tube 87 is secured to the bracket member 90 having the wheels 91 which engage the edges of the bracket member 14. The electric lamp 92 provides illumination behind the fixation object 74 which is carried on a transparent plate 93 in this instance. The device carrying the lens 73 and the fixation object 74 may be moved to any position in the slot 2 in the hemisphere 1, the wheels 91 rolling on the bracket 14.

In Fix. XII the lens 73 is carried in the tubular member 94. The fixation object 74 is carried on the rack 95 operated by the pinion 96. Secured to the tube 94 is the support plate 97 carrying the wheels 98 which roll on the edges of the bracket plate 14. The distance between the lens 73 and the fixation object 74 may be lengthened or shortened by operation of the pinion 96 on the rack 95. It will be clear that in this instance also the device carrying the lens 73 and target 74 can be moved to any desired position in the slot 2 by means of the wheels 98 running on the bracket 14.

The operation of the device carrying the lens 73 and fixation object 74 is such that the introduction into the slot 2 of the hemisphere of the test object or fixation point 74 with the lens 73 in front of it, together with means by which the distance between the lens and the fixation object can be changed and proper illumination provided, provides means by which the test object can be projected to infinity if desired, or for a myope inside of infinity, and for a presbyope outside of infinity. If it is desired to vary the optical position of the fixation or test object 74 for different angles it is easy to do so by simply shifting the device carrying the test object on the carriage provided with rolls on the bracket 14, and to adjust the position of the target optically at any distance from the eye being tested by moving the target back and forth or with respect to the lens, or moving the lens back and forth with respect to the target.

In Fig. XIII is shown a front view of the target or fixation object 74. The fixation ring 99 is of one of the primary colors, say red. The field 100 of the plate 74 is grey.

The color of the ring 99 and the grey of the plate 100 should have substantially the same normal visual intensity. It will be noted in Fig. XI that the illumination 92 is to the rear of the fixation object 74. Therefore, the color transmitted through the plate 74 will be a transmitted color and transmitted color is much preferable in testing use than a reflected color. The object in making one part of the plate 74 grey and the test ring 99 of a color, both having practically the same normal vasual intensity is that the colors can be compared on the eye. If the color sensitivity of the eye suddenly disappears all of the chart, including the ring, would have a greyish appearance, the ring fading out; or in other words, the test object 99 would tend to blend into the plate 100.

It will be understood that the use of the device as shown in Figs. X, XI and XII will permit of a much smaller hemisphere 1 to obtain the same results of field testing, and this is of practical importance for the reason that if the hemisphere 1 were made sufficiently large to give the best testing results it would be very bulky, heavy and ungainly, but with the use of the devices shown in Figs. X, XI and XII a hemisphere of practical dimensions may be used without detriment and without limiting the sphere of the field of test, whereby a much smaller and better proportioned instrument may be used.

While the operation of the various parts has been described in connection with the description of those particular parts, the operation of the device is in general about as follows: The chin rest 34 is adjusted to such a height that the eye is in line with the point 33 and the pole 3 of the field hemisphere 1. The eye not under test is aligned with the opening 61 of the double binocular fixation tube 48 and the fixation object 64 adjusted so that the fixation object 64 will be superimposed upon the fixation object 3, the said adjustment being made by turning the tube 48 axially in its bearing 49 and by means of the supports 50 and 51 in the arm 53. This double binocular fixation test may be made on either side of the point 33 simply by moving the whole double binocular fixation system from one side to the other and rotating the arm 53 on the support 31. At the same time the fixation object 64 is superimposed on the fixation object 3, the fixation object 64 will give the spherical power of the eye not under test on the scale 69 of the support 63, it being understood that the cylindrical lens 68 may be slipped into place to correct the astigmatism of the eye not under test. When the eye under test has been aligned with the fixation object 3 and the eye not under test through the binocular fixation system has superimposed the fixation object 64 over the fixation object 3 the patient is in position for having the test of his field of vision made. This may be made either by moving the rod 22 in the slot 2 of the hemisphere 1 and rotating the hemisphere 1 on its bearing 4 so that the slot 2 is carried through all of the meridians, or by means of the bracket plate 19 carrying the fixation object 16. The fixation object 16 may be moved back and forth in the slot 2 and the slot 2 may be moved in various meridians on the bearing 4. In this way the limitations of the patient's field may be indicated on the chart plate 24, the readings being taken off of the degree scale on the bracket member 14. The hemisphere is adapted to prevent anything coming in the patient's field of vision to attract his attention. If desired the operator may watch the eye of the patient under test in the mirror 43 which is aligned with the opening 3, being sighted through the bore 12. The various Phorias or imbalances of the eye may be noted by the scales 71 and 58. In those cases where it is desired to use a hemisphere of small diameter the devices indicated in Figs. IX, X, XI and XII may be used; that of Fig. IX at the pole 3, and those of Figs. X, XI and XII, as preferred in connection with the slot 2 in the hemisphere 1, the device being operated in each event as described in connection with those parts above. These devices also make available use of the grey plate 100 and the colored ring 99 as indicated in Fig. XIII and described hereinabove.

It will be understood, of course, that when the illumination shown in Figs. IX, X, XI and XII is used, the central illumination at 42 may be shut off and not used, in which case the target 64, Fig. VI, would be illuminated by the electric bulb 101 carried by the arm 63.

From the foregoing description it will be seen that I have provided simple and efficient means for carrying out the various types of tests employed in perimetry, having provided particularly a hemispherical field, a binocular fixation attachment, means for constant illumination, means for fixing the position of the eye under test, means by which the eye under test may be observed during the test by the operator, means by which a small field hemisphere may be used with the effect of a large one, means by which comparative color tests may be made, means by which the Phorias and imbalances may be indicated, means by which the spherical correction of the eye not under test may be determined, and means by which cylindrical correction for the eye not under test may be provided.

Having described my invention, I claim:

1. In a device of the character described, means for locating the position of the eye under test, a hemispherical field member having its center approximately at the position of the eye under test and being pivoted at its pole in alignment with straight ahead vision of the eye under test and having a slot extending therethrough from adjacent the said pole radially to a point adjacent its edge in which a fixation object may be moved along in the rear of the field member so that it may be seen by the eye under test in the front of the field member.

2. In a device of the character described, means for locating the position of the eye under test, an arcuate field member having its center at approximately the position of the eye under test and pivoted at its pole aligned with straight ahead vision of the eye under test and a focusing member slidably connected with the said field member so that it may be moved radially toward and from the center of said field member, said focusing member being provided with a focusing lens and a fixation object member, and means for changing the distance between said lens and fixation object.

3. In a device of the character described, means for locating the position of the eye under test, an arcuate field member having its center approximately at the position of the eye under test and pivoted at its pole aligned with straight ahead vision of the eye under test, a focusing member slidably connected with the said field member so that it may be moved radially toward and from the center of said field member, said focusing member being provided with a focusing lens and a fixation object member, means for changing the distance between said lens and fixation object, and means for illuminating the said fixation object.

4. In a device of the character described, means for locating the position of the eye under test, an arcuate field member pivoted at its pole aligned with straight ahead vision of the eye under test, a focusing member slidably connected with the said field member so that it may be moved toward and from the center of said field member, said focusing member being provided with a focusing lens and a fixation object member, and rack and pinion means for changing the distance between said lens and fixation object.

5. In a device of the character described, means for positioning the eye under test, a hemispherical field member pivoted at its pole in alignment with straight ahead vision of the eye under test and having a slot extending from adjacent the said pole to adjacent the outer edge of the hemisphere, a track member secured to the hemisphere on the rear thereof and overlying the slot and a member having a fixation object thereon movable on said track and viewable to the eye under test through said slot.

6. In a device of the character described, means for positioning the eye under test, an arcuate member pivoted at its pole aligned with straight ahead vision of the eye under test, a focusing member slidable on said arcuate member towards and away from the pole, said member having a focusing lens and a fixation member separated therefrom, and means for changing the distance between the focusing lens and the fixation member, the field of said fixation member being grey and the fixation object thereon being of a color, the normal visual intensity of which is substantially the same as the grey fixation member, said arcuate member and fixation member having separate sources of illumination of substantially the same intensity.

7. Apparatus of the class described comprising a fixation object for the eye under test and a fixation object for the eye not under test, a supporting surface upon which the fixation object of the eye under test is mounted, means interposed in the direct vision of the eye not under test designed to deflect light rays to afford vision of the fixation object of the eye not under test, said deflecting means comprising a reflector aligned with the eye not under test and a cylindrical lens interposed between the reflector and the eye not under test, the distance of said cylindrical lens from the eye not under test being that at which a spectacle lens is worn before the eye.

8. An eye testing device comprising a fixation object for an eye under test and a fixation object for an eye not under test, a supporting surface upon which the fixation object of the eye under test is mounted, means interposed in the line of straight ahead vision of the eye not under test designed to deflect light rays to afford vision of the fixation object of the eye not under test, said deflecting means comprising a reflector aligned with the eye not under test, a cylindrical lens interposed between the reflector and the eye not under test, the distance of said cylindrical lens from the eye not under test being that at which a spectacle lens is worn before the eye, a spherical lens between the reflector and fixation object for the eye not under test, and means to change the relative distance between said lens and fixation object.

9. In a device of the character described, means for locating the position of the eye under test, an arcuate field member having its center approximately at the position of the eye under test and being pivoted at its pole in alignment with straight ahead vision of the eye under test and having a slot extending through the front and rear surface walls thereof from adjacent the said pole radially to a point adjacent its edge in which a test object may be moved along in the rear of the field member and be visible through said slot to the eye under test in the front of the field member.

10. In a device of the character described, a field member pivoted at its pole aligned with straight ahead vision of the eye under test and having a slot extending through the front and rear surface walls thereof from adjacent the said pole radially to a point adjacent its edge in which a test object may be moved along in the rear of the field member and be visible through said slot to the eye under test in the front of the field member and illuminating means on said device for producing an even intensity of light over the surface of the field member and test object.

11. Apparatus of the class described comprising a fixation object for the eye under test and a fixation object for the eye not under test, a supporting surface upon which the fixation object for the eye under test is mounted, means interposed in the direct vision of the eye not under test designed to deflect light rays to afford vision of the fixation object of the eye not under test and to prevent the eye not under test from seeing the fixation object for the eye under test, said light deflecting means comprising an inclined reflector aligned with the eye not under test, a member having a fixation object aligned with the reflector, a lens between the reflector and fixation object, means for changing the distance between the lens and the fixation object, the fixation object being normally positioned at one foci of the lens and scale means on the means for changing the distance between the lens and fixation object for determining the position of the fixation means with respect to the lens.

12. In an eye testing device, a vision field member and an eye testing member comprising a lens and a target associated with and movable on said field member from its center toward its edge and in such a manner that the axis of the lens remains substantially coincident with the line of sight of the eye under test, said target and lens being adjustable relative to each other to change the focus of the lens on the target and to effectively increase and decrease the distance of the target from the eye under test.

13. In a device of the character described, means for locating the eye under test, an arcuate field member having its center of curvature approximately at the test position of the eye and pivoted at its pole, said pole being aligned with straight ahead vision of the eye under test, said pivot having connecting means thereon, a support for carrying the pivotal member of the field member a stationary chart holder secured to said support and having an opening centrally thereof communicating with the connecting means on the pivot and an indicator member having a projecting portion extending through the opening in the stationary chart holder and detachably secured to said connecting means.

14. In a device of the character described, means for locating the position of the eye under test, a hemispherical field member having its center approximately at the position of the eye under test and pivoted at its pole, said pole being in alignment with the straight ahead vision of the eye under test, the said field member having a slot extending through the wall thereof from adjacent the said pole to a point adjacent its edge in which a test object visible to the eye under test may be moved in the rear of the hemisphere radially from the center of said hemisphere to a point adjacent its edge or in the opposite direction and a test object movable in said slot, the support for said test object being substantially invisible to the eye under test during the movement of the test object in said slot radially of the hemispherical member.

EDGAR D. TILLYER.